D. B. VAN TUYL.
Damper.
No. 3,300.
2 Sheets—Sheet 1.
Patented Oct. 12, 1843.
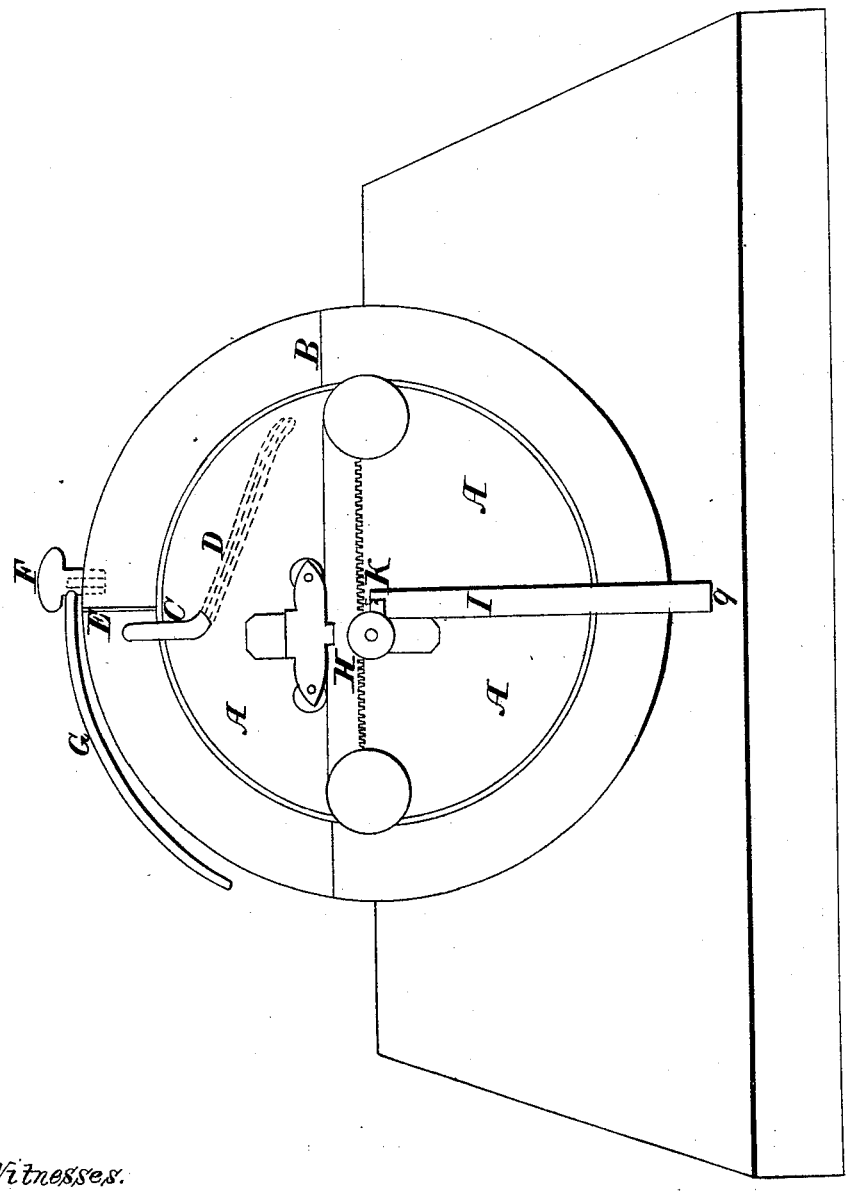
Witnesses.
Inventor.

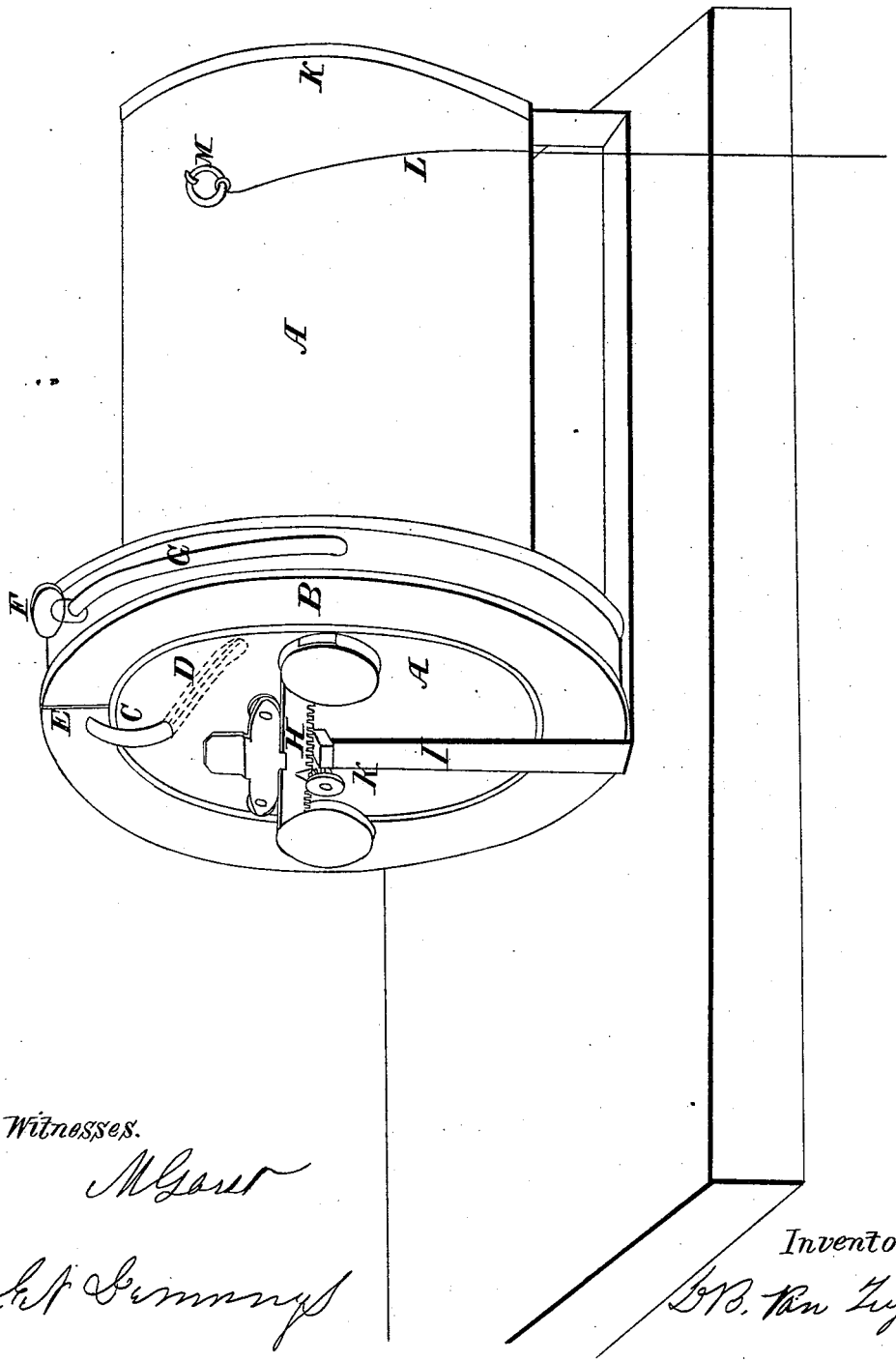

UNITED STATES PATENT OFFICE.

DAVID B. VAN TUYL, OF DAYTON, OHIO.

INSTRUMENT FOR REGULATING TEMPERATURE.

Specification of Letters Patent No. 3,300, dated October 12, 1843.

*To all whom it may concern:*

Be it known that I, DAVID B. VAN TUYL, of the city of Dayton, in the county of Montgomery and State of Ohio, have invented a machine which I have named the "Eucrator" for regulating the temperature of any place warmed or heated artificially, which I verily believe has not been known or used prior to the invention thereof by myself; and I do hereby declare that the following is a full and exact description.

A cylinder (A drawing) resting upon pivot K, K, of the capacity of half a gallon more or less containing nothing but atmospheric air, is surrounded in one part by a hollow rim B, which will contain about one sixth as much as the cylinder, A. This rim is half filled with water, the rim has a partition in it at E and on one side of this partition at C, is a communication between the rim and cylinder, and the other side of the partition there is a communication with the external air, by means of the hollow tube G, entering into the hollow stopper F and thus communicating with the rim, when the air in the cylinder is warmed by the heat of the air in the room, the air contained in the cylinder expands and a part of it is forced into the rim, which forces the water to one side, changes the center of gravity of the machine and causes the whole to turn upon its axis; when the air is condensed again by cold, this action is reversed.

A wire, letter L, attached to the cylinder, or rim, at any point (but as the most convenient represented at M, on the drawing) and by the end fastened to a valve of a stove, through which the circulation of air feeds the fire, or to a valve or door of any aperture where heated air is let into an apartment, will cause these valves or apertures, to close, or open, as the temperature of the place may rise or fall, and will thus regulate the temperature with nearly as much accuracy as a thermometer would indicate it.

In order to prevent the water from running into the cylinder in case of a greater degree of condensation of the water contained in it than usual a small tube, letter D, is placed over the opening in the cylinder in such a manner that when the machine is in such a position as will allow the water to pass from the rim to the cylinder the end of said tube, D, shall be at the highest point within it. The same precaution is necessary at the external opening F, to prevent the water from being spilled when the machine is turned too far in the opposite direction; this arrangement of the tube is all that is necessary within a moderate range of temperature say, thirty or forty degrees, but when the machine is to be subjected to the extremes of heat and cold, these tubes must be very much lengthened, which may be done by allowing the tube D, to pass out of the cylinder to any extent and again return into it or else the rim must be made of a spiral form.

The sliding balance, letter H, may also be attached to either end of the cylinder which by being moved, counteracts the leverage of the water in the rim, (which leverage indicates, of course, the extent to which it is to be moved) and thus guards against the barometric influence of the external air.

For durability and precision of action the machine should be constructed of some material which air and water have but little tendency to corrode or destroy, (to wit, light brass or tin) and at the same time should be as light as possible, and have an external surface which absorbs and radiates heat with the greatest facility.

Machinery, or apparatus, the effect of which shall be the same as the one above described, may be constructed of almost infinite varieties of shape, sizes, and materials; as it is well known that almost any substance may be used as the medium of contraction, and expansion, in the stead of atmospheric air used in the model.

What I claim is—

The mode herein described of regulating the temperature of apartments, &c., that is to say: Operating valves, &c., for the admission or exclusion of heat &c., by means of the instrument which I denominate the eucrator, consisting of a hollow cylinder mounted upon an axis and furnished with a hollow rim, the lower half of which contains water, said rim being divided into two chambers, one of which communicates with the air in the hollow cylinder and the other opening to the external air, all as set forth. I claim, also in combination with the above, the sliding balance (letter H,) for the purpose of compensating for barometric changes.

D. B. VAN TUYL.

Witnesses:
I. P. SCOTT,
W. H. BOONE.